INVENTOR.
William T. Bross
BY
Wood, Herron & Evans
ATTORNEYS

United States Patent Office 3,523,219
Patented Aug. 4, 1970

3,523,219
RELAY CONTROL CIRCUIT
William T. Bross, Cincinnati, Ohio, assignor to Liebel-Flarsheim Company, Division of Ritter Pfaudler Corporation, Rochester, N.Y., a corporation of New York
Filed Mar. 5, 1968, Ser. No. 710,521
Int. Cl. H01h 47/00
U.S. Cl. 317—137                    7 Claims

ABSTRACT OF THE DISCLOSURE

A control circuit including an A.C. relay and resistor connected in series across the terminals of a switch-controlled one-half wave rectified power supply, and a normally nonconducting device connected in parallel with the relay. The normally nonconducting device is capable of becoming conductive, to thereby short circuit the relay and prevent it from pulling-in, should the switch be closed other than at a point in the A.C. waveform when sufficient time remains in the positive one-half cycle for the relay to completely pull-in, thereby preventing closure of the relay contacts for other than at least a complete A.C. cycle commencing within a predetermined narrow band. Also disclosed is a load energization circuit, employing the foregoing control circuit, for energizing an A.C. supplied load at a zero point in the A.C. supply waveform regardless of when in the A.C. cycle a randomly actuated switch is closed.

---

This invention relates to relay control circuits, and more particularly to relay control circuits for limiting contact closure of an A.C. relay in response to random switch activation to closure for at least a full A.C. cycle commencing within a predetermined narrow band of the A.C. waveform.

In a typical medical X-ray installation means are provided for precisely regulating the interval of X-ray energization, thereby preventing undesirable risk of injury from prolonged X-ray exposure to those being X-rayed. Frequently, the means which control X-ray tube energization include a switch-controlled full wave rectified power supply having solid state switching elements such as SCR's or Triacs, a firing circuit for firing the SCR's or Triacs once per A.C. cycle, a relay control circuit to enable the SCR or Triac firing circuits to be switched on and off only at zero voltage points thereby preventing damaging electrical transients, and an R.C. Timer circuit which charges through the relay circuit and which functions to prevent the firing circuits from firing the SCR's or Triacs, and hence the X-ray tube from being energized, for other than a precisely controlled interval.

Because the SCR's or Triacs, through which power flows to the X-ray tube, have high response speeds, it is important that the relay circuit, which controls the firing of the SCR's or Triacs, be prevented from momentarily closing contacts should the on-off switch be closed at a point in the A.C. waveform when the relays do not have sufficient time to store the energy necessary to remain pulled-in for a complete one-half A.C. cycle. If the relay circuit is not so prevented, and the on-off switch is so closed, the relays can partially pull-in, closing their contacts only momentarily, that is, for a period less than a full one-half cycle. Such contact closure, while only momentary, is sufficient to fire the SCR's or Triacs, energizing the X-ray tube for a complete one-half cycle.

While the X-ray tube is energized for a full one-half cycle in response to momentary contact closure, the capacitor of the R.C. Timer, which charges through the relay circuit, charges for only a fraction of the one-half cycle, namely, the fraction during which the contacts are momentarily closed. This results in the time for fully charging the capacitor, which is coextensive with the actual period of X-ray energization, exceeding the time constant of the R.C. Timer, which is coextensive with the desired period of X-ray energization. With actual energization exceeding desired energization, a patient is subjected to X-rays for a period exceeding the desired period contemplated by the R.C. Time constant, the excess being equal to the portion of the A.C. cycle which follows closure of the momentarily operated relay contacts. This excess, in practice, can be almost as long as a complete one-half cycle. While one-half cycle may not appear to be long, when compared to a typical X-ray exposure interval of one or two cycles, it represents an X-ray exposure timing error of up to 50%.

It has been an objective of this invention to provide a relay control circuit which prevents the contacts of a switch-responsive relay from momentarily closing, that is, closing for anything other than at least one complete cycle, should the switch be randomly actuated at a point in the A.C. cycle other than when the relay is susceptive of energization for a period sufficient to enable it, once pulled-in, to remain pulled-in for a complete one-half cycle of the A.C. waveform. This objective has been accomplished by providing a very simple, but yet extraordinarily effective, relay control circuit which contemplates placing a series connected A.C. relay and resistor across a switch and one-half wave rectified power supply, and connecting a normally nonconductive device in parallel with the relay. In operation, the normally nonconducting device becomes conductive, to short circuit the relay and prevent it from pulling-in, should the switch be closed other than at a point in the A.C. waveform when sufficient time remains in the positive one-half cycle for the relay to completely pull-in, thereby preventing closure of the relay contacts for other than at least a complete A.C. cycle commencing within a predetermined narrow band.

In a preferred embodiment of the invention the normally nonconducting device is a four layer diode which becomes conductive only when subjected to a forward voltage in excess of a predetermined voltage known as the breakover voltage. With such a device, if the switch is closed anywhere between a point where the instantaneous waveform has a zero value and a point where it has a value equal to the breakover voltage, the instantaneous supply voltage, which due to relay inductance appears entirely across the relay and hence the four layer diode, is insufficient to breakover the diode and the relay is energized. Providing the time required to energize the relay sufficiently to effect a complete pull-in, known as the pull-in interval, is less than the time it takes for the instantaneous supply voltage to go from the breakover level to zero, the relay will completely pull-in if switch closure occurs anywhere between an instantaneous supply voltage of zero and the breakover voltage.

An advantage of the relay control circuit of this invention, in addition to preventing partial relay pull-in, and hence momentary contact closure, is that the point in the A.C. cycle where the relay contacts close is limited to a very narrow band regardless of when in the cycle the randomly activated switch is closed. Specifically, contact closure is limited to a band having a width equivalent to the time it takes the instantaneous supply voltage to go from zero to the breakover level, and having a location which is spaced from the zero voltage point by a distance equal to the pull-in interval of the relay.

In accordance with certain additional principles of this invention it has been an objective to provide a circuit for preventing energizing of a load, in response to random closure of a switch, at any time other than at a zero voltage point in the A.C. cycle. This objective has been accomplished by providing, in combination with the foregoing relay control circuit, two series circuits connecting one side of the load to one terminal of the A.C. supply, the other side of the load being connected to the other side of the supply. The series circuits each include a diode, the diodes of each circuit being oppositely poled, and a relay contact. One of the relay contacts is controlled by the relay of the control circuit described previously, while the other relay contact is controlled by a second relay which pulls-in in response to pulling-in of the control circuit relay.

In operation, when the switch is closed, the relay of the control circuit closes its contact completing the series circuit path in which it is connected and energizing the remaining relay, and also the load, at the start of the next one-half cycle of the A.C. supply. The second relay, in turn, closes its contact at the start of the one-half cycle succeeding the one-half cycle of closure of the control relay contact, completing the second series circuit and thereby enabling the load to be energized for a successive one-half cycle also commencing at a zero voltage point. In this way, the load is energized on an A.C. basis starting at a zero voltage point in the A.C. supply waveform in response to actuation of a switch closed at random.

Other advantages and objectives of this invention will become apparent from the following detailed description of the preferred embodiment thereof in which.

Figure 1:
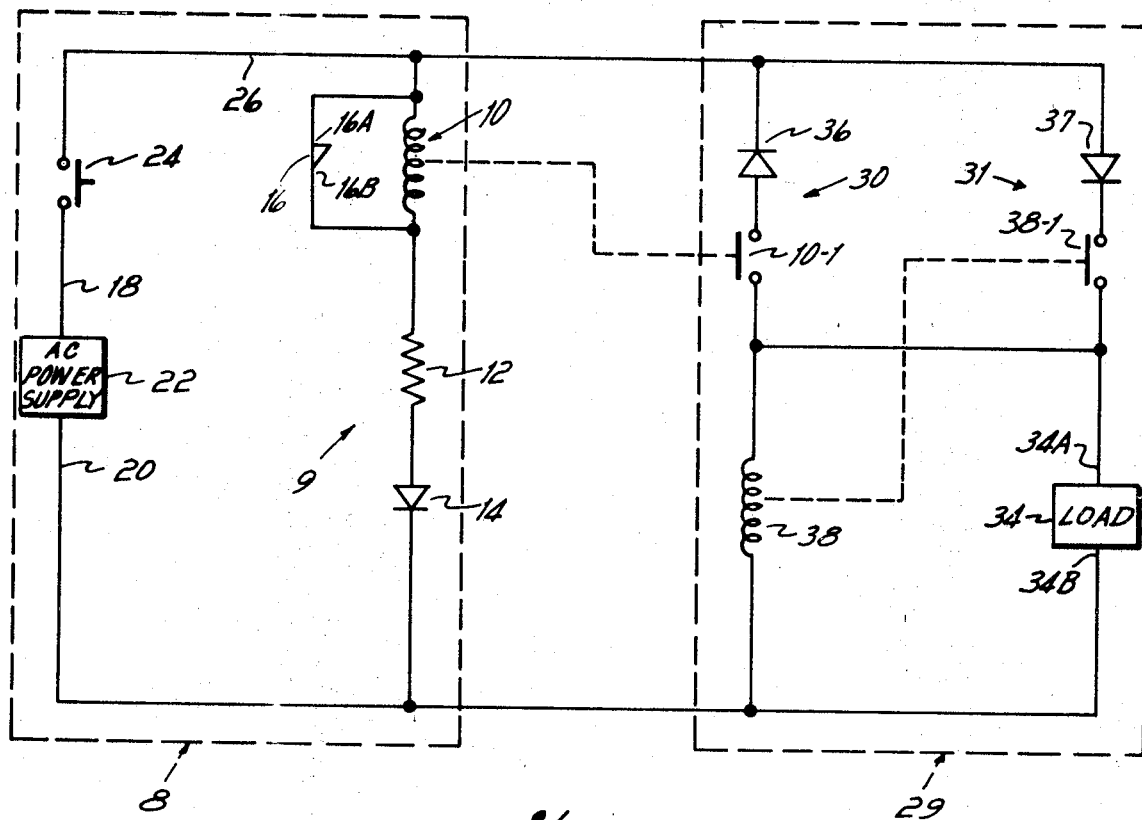
FIG. 1 is a schematic electrical circuit diagram of the control circuit of this invention, showing it in combination wth an electrical system for energizing a load at zero voltage point with which it finds a high degree of utility.

Referring to FIG. 1, a control circuit 8 is schematically depicted having a series circuit path 9 including a relay 10 having a normally open contact 10-1 to be described, a resistor 12, and a unilateral conducting device or diode 14. Also included in the control circuit 8 is a normally nonconducting circuit component 16 connected in parallel with the relay 10. The normally nonconducting component 16 in combination with the series elements 10, 12 and 14 are connected via a switch 24 between the terminals 18 and 20 of an A.C. power supply or source 22.

Figure 2:
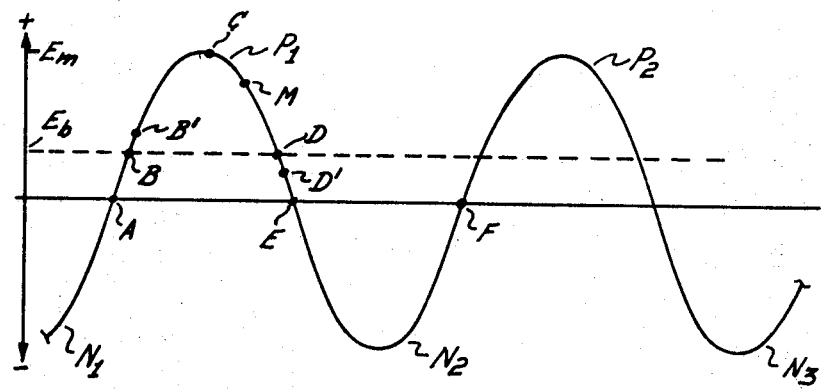
FIG. 2 is a plot of the voltage of the A.C. supply versus time, showing the relative location of important points in the operational cycle of the circuit of FIG. 1.

The diode 14 is provided to limit energization or excitation of the relay 10 by the A.C. supply 22 to alternate one-half cycles of the A.C. supply waveform. Thus the A.C. supply 22 and diode 14 combine to effectively energize the relay 10 on a one-half wave rectified basis. The alternate one-half cycles of the A.C. supply waveform during which time the diode 14 is forward biased and the relay 10 susceptive of energization or excitation by the A.C. supply 22 are herein termed "positive" one-half cycle of the A.C. supply waveform. The alternate one-half cycles of the A.C. supply waveform during which time the diode 14 is reverse biased and the relay 10 not susceptive of energization or excitation by the A.C. supply 22 are herein termed "negative" one-half cycles of the A.C. supply waveform. FIG. 2 shows the waveform of the output provided by the supply 22 across its terminals 18 and 20, including the positive one-half cycles $P_1$, $P_2$, . . . and the negative one-half cycles $N_1$, $N_2$, . . . .

The relay 10 is of the A.C. type and has a predetermined "pull-in interval." A relay marketed by Potter Brumfield Company, and designated Model No. KA-3107, having a "pull-in interval" of approximately 90 electrical degrees has been found to operate satisfactorily. As used herein, the term "pull-in interval" means the duration or period of time during a positive one-half cycle P for which it is necessary to energize or excite the relay from the one-half wave rectified A.C. source 22 in order to enable the relay to "completely pull-in," that is, to enable the relay, when it closes its contact 10-1 during the positive one-half cycle of energization, to maintain the contact closed during the succeeding negative one-half cycle N when the polarity of the supply 22 is reversed. A "complete pull-in" of the relay 10 is to be contrasted with a "partial pull-in" in which the relay is energized or excited during a positive one-half cycle for a period sufficient to cause its contact 10-1 to close and remain closed during a portion of the succeeding negative one-half cycle, but is not energized or excited for a period equal to or greater than the "pull-in interval" and, therefore, does not store sufficient electrical energy to maintain its contact 10-1 closed for the entire succeeding negative one-half cycle.

The normally nonconducting circuit component 16 connected in parallel with the relay 10 may take numerous forms, but preferably is in the form of a four-layer diode. The four-layer diode operates such that when subjected to a forward voltage, that is, a voltage of a polarity such that terminal 16A thereof is more positive than terminal 16B thereof, it remains nonconductive so long as the forward voltage is below a predetermined level known as the "breakover voltage." Should the forward voltage applied to the four-layer diode 16 equal or exceed the breakover voltage, the four-layer diode is rendered conductive, and remains conductive so long as the minimum holding current is flowing therethrough. Should the current through the four-layer diode drop below the minimum holding current, the four-layer diode changes from a conductive state to a nonconductive state, and remains nonconductive so long as the forward voltage thereacross remains less than the breakover voltage. The four-layer diode 16 is nonconductive when subjected to a reverse voltage, that is, when its terminal 16B is more positive than its terminal 16A, and remains nonconductive so long as the reverse voltage thereacross does not exceed a level known as the peak inverse voltage. Should the reverse voltage across the four-layer diode 16 exceed the peak inverse voltage, the diode is destroyed or otherwise permanently damaged.

While a four-layer diode such as that marketed by Clevite Corporation, designated Model No. 4E50-8, and having a breakover voltage of 50 volts is preferred for use as the normally nonconducting component 16, those skilled in the art will appreciate that other circuit components having the same or similar characteristics may also be used. Specifically, other circuit components capable of remaining nonconductive so long as the forward voltage thereacross remains below a predetermined level may be utilized.

The resistor 12 interconnecting the relay 10 and the anode of the four-layer diode 14 is provided to limit the maximum voltage drop across the relay 10, when current flows through the relay, to a value less than the four-layer diode breakover voltage. This prevents the four-layer diode 16 from breaking over and short-circuiting the relay 10, and thereby causing the relay to prematurely drop out, once it has pulled-in. The point in time when current flows through the relay necessarily lags the point in time corresponding to the application of voltage thereacross due to the inductive reactance of the relay.

The relationship between the pull-in interval of the relay 10, the breakover voltage of the four-layer diode 16, and the A.C. waveform of the supply 22 must be selected such that it is possible for the relay 10 to completely pull-in during the latter part of a positive one-half cycle P, should the switch 24 be in a closed position during the positive one-half cycle for a duration at least equal to the pull-in interval. To satisfy this requirement, the breakover voltage and the maximum amplitude of the A.C. waveform must be such that the time in electrical degrees required for the A.C. waveform to go from a value equivalent to the breakover voltage through the peak amplitude of the A.C. waveform to a value of zero is equal to or greater than the pull-in interval. Stated differently, and with reference to FIG. 2, the breakover voltage $E_b$ must be selected relative to the maximum voltage $E_m$ of the A.C. waveform such that the duration in electrical degrees between point B and point E of the A.C. waveform that is, the duration of time it takes for the A.C. waveform, to go from point B through points C and D to point E, is greater than the pull-in interval.

With the breakover voltage $E_b$ and the maximum voltage $E_m$ of the A.C. supply selected as described, it is possible for the relay 10 to completely pull-in during a positive one-half cycle P in response to random closing of the switch 24. For example, it is possible for the relay 10 to completely pull-in should the switch 24 be closed for the pull-in interval commencing any time in the A.C. waveform prior to point B.

If the switch 24 is closed during the negative one-half cycle $N_1$ and maintained in a closed position, the relay 10 is energized during the succeeding positive one-half cycle $P_1$ starting at point A and continuing through points B, C, D and E. The exact point in the positive one-half cycle $P_1$ when the relay 10 pulls-in is determined by the exact duration in electrical degrees of the pull-in interval. If the pull-in interval is 90 electrical degrees, the relay 10 pulls-in, should the switch 24 be closed during a point in the negative one-half cycle $N_1$, at approximately point C in the positive one-half cycle $P_1$. Should the switch 24 be closed for the pull-in interval commencing at point A, the relay 10 also pulls-in at point C, assuming again its pull-in interval is equal to 90 electrical degrees. Should the switch 24 be closed at any time between point A and point B of the A.C. waveform, the relay 10 completely pulls-in approximately 90 electrical degrees after the point at which the switch is closed, assuming the pull-in interval is 90 degrees.

Should the switch 24 be closed at some point in the A.C. waveform between points B and D when the instantaneous supply voltage exceeds the breakover voltage $E_b$, the relay 10 does not completely pull-in nor does its contact 10 close momentarily to effect a partial pull-in. Because of the inductance of the relay 10, at the instant switch 24 is closed the instantaneous value of the voltage of the source 22 appearing across terminals 18 and 20 is applied in its entirety across the relay 10, and hence, across the four-layer diode 16 connected in parallel therewith. For example, if the switch 24 is closed at any point between point C and point D such as at point B when the instantaneous supply voltage across terminals 18 and 20 exceeds the breakover voltage $E_b$, the voltage applied to the relay 10, and hence, to fourlayer diode 16 exceeds the breakover voltage $E_b$, causing the diode 16 to breakover. With the four-layer diode 16 in a breakover condition, the relay 10 is effectively short-circuited, and energization and pulling-in thereof is prevented. It is important to note that even though the switch 24, which is closed at point B', remains closed for a period equal to or exceeding the pull-in interval, the relay 10 does not pull-in, either completely or partially, and hence the contact 10-1 never closes, not even momentarily.

Should the switch 24 be closed during a positive one-half cycle at a point when the instantaneous voltage across the supply terminals 18 and 20 is decreasing and below the breakover voltage $E_b$, such as at point D' between point D and point E, the four layer diode 16 does not breakover and short-circuit the relay 10. Nevertheless, the relay 10 does not pull-in. Although closure of the switch 24 at point D' does not cause the diode 16 to breakover and thereby short-circuit the relay 10, closure of the switch 24 at point D' occurs at a point so late in the positive one-half cycle $P_1$ that it precludes the relay 10 from being energized or excited by the source 22 for a period equal to the pull-in interval. Hence, the relay 10 does not pull-in. In fact, the period between point D' and point E during which time the relay 10 is energized or excited by the source 22 is so brief that the relay never pulls-in, not even momentarily, and hence contact 10-1 never closes. Thus, while closing the switch the point D' does not result in short-circuiting the relay 10, the period D'-E remaining in the positive one-half cycle $P_1$ is so much less than the pull-in interval that the relay never receives sufficient excitation to even momentarily pull-in.

With the control circuit of this invention, the relay 10 pulls-in, closing the contact 10-1, only during a predetermined and narrow band in a positive one-half cycle regardless of when in a positive or negative cycle the switch 24 is closed. The width of this predetermined narrow band is equal to the time it takes for the supply voltage to go from zero to the breakover voltage, and hence is dependent on the relationship of the breakover voltage $E_b$ and the maximum supply voltage $E_m$, becoming wider as the difference between $E_b$ and $E_m$ increases. For example, if the breakover voltage $E_b$ is 50 volts and the maximum supply voltage $E_m$ is 160 volts, the width of the narrow band during which the relay pulls-in is approximately 20 electrical degrees, or the distance between point A and point B.

The exact location of the pull-in band relative to the supply waveform depends upon the width of the pull-in interval of the relay 10. For example, if the pull-in interval of the relay 10 is 90 electrical degrees, the location of the pull-in band is 90 electrical degrees beyond the band defined by points A and B, or between 90 electrical degrees and 110 electrical degrees. Thus, the relay 10 pulls-in closing the contact 10-1 during a predetermined narrow band extending from 90 electrical degrees to 110 electrical degrees regardless of when during a positive or negative one-half cycle the switch 24 is randomly closed.

The control circuit 8 of this invention finds particular utility when used in conjunction with a circuit 29 for initiating energization of an A.C. supplied load at a zero point in the A.C. supply waveform regardless of when a randomly actuated switch is closed. Referring to FIG. 1, the circuit 29 is shown including two series circuit paths 30 and 31, each of which includes a unilateral conducting device or diode and a relay contact. The series circuit paths 30 and 31 are connected between one terminal of the A.C. supply 22, namely, terminal 18 via switch 24, and a terminal 34A of load circuit 34, the other terminal 34B of which is connected to the other terminal 20 of the A.C. supply.

The series circuit 30 more specifically, includes a diode 36 poled oppositely relative to the diode 14, and the normally open relay contact 10-1 controlled by relay 10. The series circuit 31 includes a diode 37 poled oppositely to the diode 36, and a normally open relay contact 38-1. The relay contact 38-1 is controlled by a relay 38 connected between terminal 20 of the supply 22 and the relay contact 10-1. Relay 38 is, like relay 10, and A.C. relay having a pull-in interval of less than 180 electrical degrees. Relay 38 is preferably of the type marketed by Potter Brumfield designated Model No. KA-2740-1.

The series circuit paths 30 and 31, which contain oppositely poled diodes 36 and 37, combine to provide an A.C. energization path for the load 34 when the contacts 10-1 and 38-1 are both closed.

By reason of the relay control circuit 8 which limits the closure of contact 10-1 of circuit 29 to a predetermined narrow band in a positive one-half cycle regardless of the point in the positive or negative one-half cycle when the switch 24 is randomly closed, it is possible to insure that the load 34 is not initially energized at a point in the A.C. waveform other than when the waveform is increasing in magnitude and passing through zero such as at point A.

In operation, regardless of when the switch 24 is closed during a positive or a negative one-half cycle of the A.C. waveform, the relay 10 only pulls-in, closing its normally open contact 10-1, during a predetermined narrow band in the one-half cycle, namely, the band between 90 electrical degrees and 110 electrical degrees. Therefore, assuming the switch 24 is closed at a random point in the A.C. supply waveform, the contact 10–1 closes somewhere in the narrow band between 90 electrical degrees and 110 electrical degrees, such as at point C. When contact 10–1 closes at point C, the diode 36 is reversed biased and consequently the load 34 cannot be energized. When, however, the supply waveform becomes negative at point E corresponding to the beginning of the negative one-half cycle $N_2$ energization of the load commences. Thus, random closure of the switch is effective, by reason of the control circuit 8, to initiate load energization at zero voltage point, namely, point E.

When the A.C. waveform becomes positive at point E, in addition to energizing the load 34, the closed contact 10–1 also is effective to energize the relay 38. When the relay 38 has been energized for a period corresponding to its pull-in interval, the relay 38 pulls-in, closing its normally open contact 38–1. Assuming the relay 38 is selected such that its pull-in interval is less than 180 electrical degrees, that is, less than the distance in electrical degrees between point E where the relay 38 is initially energized and point F where the polarity of the supply 22 reverses de-energizing the relay 38, the relay 38 pulls-in some time during the negative one-half cycle $N_2$ between point E and point F, closing the normally open contact 38–1. Closure of the contact 38–1 during the negative one-half cycle $N_2$ completes the series circuit 31 to the load 34. However, since the diode 37 is reverse biased during the negative one-half cycle $N_2$, completion of the series circuit path 31 through the now closed relay contact 38–1 is ineffective to energize the load 34 through this path. However, when the supply polarity reverses at point F corresponding to the beginning of the positive one-half cycle $P_2$, the diode 38 become forward biased, establishing an energization path through the series circuit path 31 to the load 34. Thus, during the positive one-half cycle $P_2$ the load 34 is energized through the series circuit path 31.

The load 34 continues to be energized on an A.C. basis as long as switch 24 is closed. During negative one-half cycles N the load 34 is energized via forward biased diode 36 and closed contact 10–1; during positive one-half cycles P and the load is energized via forward biased diode 37 and closed contact 38–1.

The importance of the operational characterstics of the control circuit 8 of this invention, particularly the capability of limiting relay pull-in to only complete pull-in, and then only to complete pull-in during a predetermined narrow band notwithstanding random closure of a switch, can be appreciated by considering the consequences of removing the four-layer diode 6, and assuming that the load 34 controls both an (a) SCR or Triac firing circuit for an SCR or Triac X-ray tube power supply and (b) an R-C timer which after a predetermined interval of load energization disables the firing circuits, removing power from the X-ray tube. Such assumptions, as indicated previously are realistic in the field of medical X-ray apparatus.

With the foregoing assumptions in mind, if the four-layer diode 16 is removed and the switch 24 closed during the positive one-half cycle $P_1$ beyond the band defined by points A and B, such as at point M, where partial pull-in of the relay 10 is possible, the relay contact 10–1 is likely to momentarily close, reopening during the negative one-half cycle $N_2$. With the relay contact 10–1 closed for a portion of the negative one-half cycle $N_2$, the load 34 is briefly energized through the series circuit 30. Although the load 34 is energized through the series circuit 30 for only a brief period during the negative one-half cycle $N_2$, it is sufficient to fire the SCR's or Triacs controlled by the load 34 which, once fired, latch for the remainder of the negative one-half cycle $N_2$, in turn energizing the X-ray tube for the full one-half cycle $N_2$.

While the X-ray tube is energized for the full negative one-half cycle $N_2$, the load 34 is energized for only a portion of the negative one-half cycle. With the load energized for only a portion of the negative one-half cycle, the capacitor of the R-C timer, the charge time of which determines the point at which the X-ray tube is de-energized, charges for only a portion of the one-half cycle. With the X-ray tube energized for a full negative one-half cycle and the load, and hence the capacitor of the R-C timer, energized for only a portion of the negative one-half cycle, the actual time required for the capacitor to fully charge and de-energize the X-ray tube exceeds the time constant of the R-C timer. With the capacitor charge time in excess of the time constant, the X-ray tube is energized for a period greater than that desired as contemplated by the value of the time constant. The excess X-ray tube energization time is equal in amount to that portion of the negative one-half cycle $N_2$ remaining after the contact 10–1 of the partially pulled-in relay 10 has reopened, and may be as large as 150 electrical degrees. When it is realized that an X-ray tube is frequently only energized one or two cycles in the course of making X-rays of patients for medical purposes, the energization of the X-ray tube for an additional period close to a complete one-half cycle due to a partial pull-in of relay 10 and momentary closure of relay contact 10–1 constitutes, on a percentage basis, a relatively large error in timing of the interval for which the X-ray tube is energized. Such errors subject patients to unnecessary X-radiation exposure, and possible injury.

Having described the preferred embodiment of my invention, what I desire to claim and protect by Letters Patent is:

1. A circuit for restricting a change in the energization condition of an A.C. powered load to a predetermined narrow band in the waveform of an A.C. power supply, said circuit comprising:
   a series network connected across said A.C. power supply including:
   - (a) a relay having a pull-in interval of less than one-half the period of said A.C. supply waveform, said relay also having a contact connected in circuit with said A.C. powered load for changing the energization condition of said load when said relay pulls in,
   - (b) a resistor having a resistance sufficient to limit to a predetermined level the peak voltage across said relay when said relay is pulled-in,
   - (c) a polarizing diode, a normally nonconducting circuit component connected in parallel circuit arrangement with said relay, said component being operative to conduct when the instantaneous voltage across said component exceeds a specified breakover level in excess of said predetermined level, the peak of the A.C. voltage waveform exceeding said breakover level, said breakover level being such that the interval in electrical degrees required for said A.C. waveform to change from zero volts to a voltage value equal to said breakover level does not exceed the difference between 180 electrical degrees and the electrical degree equivalent of said pull-in interval, and a randomly closeable switch in series with said A.C. power supply, said switch being operative to pull-in said relay and alter the energization condition of said load only when closed for a duration which is at least as long as said pull-in interval and which begins no later than during a predetermined narrow band lying between zero electrical degrees in the A.C. supply waveform and the electrical degree point in the A.C. supply waveform when the instantaneous A.C. supply voltage approximately equals said breakover level.

2. A circuit comprising:
   a series network connected across an A.C. power source having an output waveform with a voltage maximum $E_m$, said network including:
(a) a resistor,
(b) a diode,
(c) a relay which when connected in said series network has a predetermined pull-in interval and a peak voltage drop thereacross, and which has at least one contact connected in a load circuit, and a normally nonconducting circuit component connected in parallel with said relay which becomes conductive when subjected to a breakover voltage $E_b$ to short circuit said relay, said breakover voltage being greater than said peak voltage drop, and said pull-in interval being less than the interval necessary for the instantaneous value of the A.C. waveform output from said source to go from $E_b$ through $E_m$ to zero, thereby enabling said relay to actuate said contact and alter the state of load energization only if a randomly closeable switch connected in series with said A.C. supply is closed for an interval which is at least equal to said pull-in interval and which commences when said diode is forward biased and the magnitude of the instantaneous A.C. waveform is increasing and has a value between zero and $E_b$.

3. A control circuit for enabling the contacts of a relay to close only when a switch in series with a one-half wave rectified power supply and the control circuit is closed for an interval which is at least equal to the pull-in interval of said relay and which commences when the instantaneous magnitude of the supply waveform is increasing and between zero and a predetermined voltage, said control circuit comprising:

a normally nonconducting component connected in parallel with said relay, said component becoming conductive when subjected to a breakover voltage at least equal to said predetermined voltage for short circuiting said relay if said switch is closed when the instantaneous magnitude of said waveform is increasing and between said predetermined voltage and zero, a resistor connected in series with said relay for limiting to a value less than said predetermined voltage the peak voltage drop across said relay when said relay is pulled-in, thereby preventing said component from conducting when said switch is closed for an interval at least equal to said pull-in interval and commencing when the instantaneous magnitude of said waveform is increasing and between zero and said predetermined voltage.

4. A circuit for energizing an A.C. supplied load at a zero point in the A.C. supply waveform in response to random closure of a switch connected in the circuit, said circuit comprising:

a first series network connected across an A.C. supply having two terminals, said first network including:
(a) a first relay having a pull-in interval of less than one-half the period of said A.C. supply waveform, and having a first contact,
(b) a resistor having a resistance sufficient to limit to a predetermined level the peak voltage across said relay when said relay is pulled-in,
(c) a first polarizing diode poled in a first direction, a second series network connected between said A.C. supply terminals including:
(a) a second polarizing diode poled oppositely to said first diode,
(b) a second relay having a pull-in interval of less than one-half the period of said A.C. supply waveform, and having a second contact,
(c) said first contact, a third series network having one terminal thereof connected to one of said terminals of said A.C. supply, said third network including:

(a) a third polarizing diode poled oppositely to said second diode, and
(b) said second relay contact, a load connected between said second contact and said other terminal of said supply, a normally nonconducting circuit component connected in parallel circuit arrangement with said first relay, said component being operative to conduct when the instantaneous voltage across said component exceeds a specified breakover level in excess of said predetermined level, said breakover level being such that the interval in electrical degrees required for said A.C. waveform to change from zero volts to a voltage value equal to said breakover level does not exceed the difference between 180 electrical degrees and the electrical degree equivalent of said pull-in interval, and a randomly closeable switch in series with said A.C. power supply, said switch being operative to pull-in said first relay only when closed for a duration which is at least as long as said pull-in interval and which begins no later than during a predetermined narrow band lying between zero electrical degrees in the A.C. supply waveform and the electrical degree point in the A.C. supply waveform when the instantaneous A.C. supply voltage approximately equals said breakover level, said pulling-in of said first relay being operative to in turn pull-in said second relay thereby causing said load to be energized on an A.C. basis commencing at a zero point in said A.C. waveform.

5. A circuit for energizing an A.C. supplied load at a zero point in the A.C. supply waveform in response to random closure of a switch connected in the circuit, said circuit comprising:

a power supply having two terminals,
a load having one side connected to one of said terminals,
a first series circuit path including a first diode poled in one direction and a first relay contact,
a second series circuit path including a second diode poled oppositely to said first diode and a second relay contact,
said first and second series paths each connected between the other side of said load and the other of said supply terminals,
a third series circuit path connected between said supply terminals including:
(a) a first relay controlling said first contact, and having a pull-in interval of less than one-half the period of said A.C. supply waveform,
(b) a resistor having a resistance sufficient to limit to a predetermined level the peak voltage across said first relay when said first relay is pulled-in,
(c) a third diode poled oppositely to said first diode, a normally nonconducting circuit component connected in parallel circuit arrangement with said first relay, said component being operative to conduct when the instantaneous voltage across said component exceeds a specified breakover level in excess of said predetermined level, said breakover level being such that the interval in electrical degrees required for said A.C. waveform to change from zero volts to a voltage value equal to said breakover level does not exceed the difference between 180 electrical degrees and the electrical degree equivalent of said pull-in interval, a randomly closeable switch in series with said A.C. power supply between the terminals and the said circuits, said switch being operative to pull-in said first relay only when closed for a duration which is at least as long as said pull-in interval and which begins no later than during a predetermined narrow band lying between zero electrical degrees in the A.C. supply waveform and the electrical degree point in the A.C. supply waveform when the instantaneous A.C. supply voltage approximately equals said breakover level, and a second relay controlled by the first series circuit path and the power supply and controlling said second contact, said second relay connected to pull-in only in response to, and during the one-half cycle of said supply waveform succeeding, the pulling-in of said first relay, said pulling-in of said first and second relays being operative to close said first and second contacts and thereby cause said load to be energized on an A.C. basis commencing at a zero point in said A.C. waveform.

6. A control circuit comprising:

a supply of one-half wave rectified current derived from an A.C. voltage supply waveform, a relay having a pull-in interval of less than one-half the period of said A.C. supply waveform, said relay also having a contact connected in circuit with an A.C. powered load for changing the energization condition of said load when said relay pulls-in, a resistor connected in series with said relay for limiting to a predetermined level the peak voltage across said relay when said relay is pulled-in, a normally nonconducting circuit component connected in parallel circuit arrangement with said relay, said component being operative to conduct when the instantaneous voltage across said component exceeds a specified breakover level in excess of said predetermined level, said breakover level being such that the interval in electrical degrees required for said A.C. waveform to change from zero volts to a voltage value equal to said breakover level does not exceed the difference between 180 electrical degrees and the electrical degree equivalent of said pull-in interval, and a randomly closeable switch in series with said supply, said switch and supply being connected across the series connected relay and component and resistor, said switch being operative to pull in said relay when closed for a duration which is at least as long as said pull-in interval and which begins no later than during a predetermined narrow band lying between zero electrical degrees in the one-half wave rectified supply waveform and the electrical degree point in the A.C. supply waveform when the instantaneous A.C. supply voltage approximately equals said breakover level, said maximum A.C. voltage of the waveform exceeding said breakover level voltage of said component.

7. A circuit for restricting a change in the energization condition of an A.C. powered load to a predetermined narrow band in the waveform of a one-half wave rectified power supply, said circuit comprising:

a series network connected across said one-half wave rectified supply including:

(a) a relay having a pull-in interval of less than one-half the period of said one-half wave rectified supply waveform, said relay also having a contact connected in circuit with said A.C. powered load for changing the energization condition of said load when said relay pulls-in, (b) a resistor having a resistance sufficient to limit to a predetermined level the peak voltage across said relay when said relay is pulled-in, a normally nonconducting circuit component connected in parallel circuit arrangement with said relay, said component being operative to conduct when the instantaneous voltage across said component exceeds a specified breakover level in excess of said predetermined level, said breakover level being such that the interval in electrical degrees required for said one-half wave rectified waveform to change from zero volts to a voltage value equal to said breakover level does not exceed the difference between 180 electrical degrees and the electrical degree equivalent of said pull-in interval, and a randomly closeable switch in series with said one-half wave rectified power supply and said network and component, said switch being operative to pull-in said relay and alter the energization condition of said load only when closed for a duration which is at least as long as said pull-in interval and which begins no later than during a predetermined narrow band lying between zero electrical degrees of the one-half wave rectified supply waveform and the electrical degree point in the one-half wave rectified supply waveform when the instantaneous A.C. supply voltage approximately equals said breakover level, said maximum waveform voltage of the power supply being greater than the breakover level of the component.

References Cited

UNITED STATES PATENTS

| | | | |
|---|---|---|---|
| 2,924,754 | 2/1960 | Mead | 317—124 |
| 3,343,034 | 4/1964 | Ovshinsky | 317—11 |
| 3,134,052 | 5/1964 | Le Cronier et al. | 317—123 |

J. D. MILLER, Primary Examiner

C. L. YATES, Assistant Examiner

U.S. Cl. X.R.

317—123, 148.5